US012723004B1

(12) United States Patent

Agarwal et al.

(10) Patent No.: US 12,723,004 B1

(45) Date of Patent: Sep. 1, 2026

(54) ULTRA HIGH TEMPERATURE CERAMICS (UHTCS) INK WITH IMPROVED PROCESSABILITY AND DIMENSIONAL CONTROL

(71) Applicants: Varad Agarwal, Miami, FL (US); Ambreen Nisar, Miami, FL (US); Tony Thomas, Miami, FL (US)

(72) Inventors: Varad Agarwal, Miami, FL (US); Ambreen Nisar, Miami, FL (US); Tony Thomas, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 19/371,553

(22) Filed: Oct. 28, 2025

(51) Int. Cl.

| | |
|---|---|
| ***C04B 35/56*** | (2006.01) |
| ***B28B 1/00*** | (2006.01) |
| ***B33Y 10/00*** | (2015.01) |
| ***B33Y 70/00*** | (2020.01) |
| ***C04B 35/626*** | (2006.01) |
| ***C04B 35/634*** | (2006.01) |
| ***C04B 35/64*** | (2006.01) |

(52) U.S. Cl.

CPC .......... *C04B 35/5607* (2013.01); *B33Y 70/00* (2014.12); *C04B 35/6263* (2013.01); *C04B 35/63424* (2013.01); *C04B 35/64* (2013.01); *B28B 1/001* (2013.01); *B33Y 10/00* (2014.12); *C04B 2235/3839* (2013.01); *C04B 2235/6021* (2013.01)

(58) Field of Classification Search

CPC .............. C04B 35/515; C04B 35/5607; C04B 35/63424; C04B 35/6263; C04B 2235/3839; C04B 35/64; B33Y 70/00; B33Y 70/10; B33Y 80/00; B28B 1/001

See application file for complete search history.

(56) References Cited

FOREIGN PATENT DOCUMENTS

| | | | | |
|---|---|---|---|---|
| CN | 107500781 A | * 12/2017 | ....... C04B 35/63452 |
| CN | 111825454 | * 10/2020 | ............... B28B 1/00 |
| WO | WO-2019161311 A1 | * 8/2019 | ............. C23C 24/10 |

* cited by examiner

*Primary Examiner* — Pegah Parvini

(74) *Attorney, Agent, or Firm* — SALIWANCHIK, LLOYD & EISENSCHENK

(57) ABSTRACT

Compositions and methods are provided for generating ultra-high loaded, ultra-high temperature ceramics (UHTCs) ink for extrusion three-dimensional (3D) printing with enhanced shrinkage control. The advanced formulations significantly enhance printability, densification, and micro-structural control of complex UHTC components, facilitating near-net-shape fabrication with improved mechanical properties and thermal stability. Consequently, the innovation significantly diminishes the necessity for extensive post-processing, minimizes defects such as shrinkage and cracking, and broadens the applicability of additive manufacturing techniques for high-performance refractory materials in extreme environments.

18 Claims, 4 Drawing Sheets

| Feature | This work (TaC ink) | CN104526838 A (2015) | Gardini et al. (2024) | Kemp et al. (2021) | Liu et al. (2022) | Sesso et al. (2021) |
|---|---|---|---|---|---|---|
| Material system | TaC (UHTC) | TCP, $ZrO_2$, $Al_2O_3$, SiC | $ZrB_2$ with short carbon fibers | $ZrB_2$–SiC with chopped fibers | $ZrB_2$–SiC with continuous carbon fibers | $ZrB_2$ |
| Ceramic loading | 87 wt.% | High (Not specified) | Not specified | 47.5 vol.% $ZrB_2$ + 10 vol.% SiC fibers (~80 wt.% total) | 35 vol.% $ZrB_2$ + SiC fibers (~75 wt.%) | 30 vol.% $ZrB_2$ (~70 wt.%) |
| Plasticizer | Glycerol (2 wt.%) | Not specified | Not specified | Pluronic F-127 (exact wt.% not specified) | Not specified | PEG (exact wt.% not specified) |
| Dispersant | PAA (1 wt.%, 2000 g/mol) | Fatty acids, unspecified | Not specified | Polyethyleneimine (PEI) (exact wt.% not specified) | PEI (exact wt.% not specified) | Ammonium polyacrylate (exact wt.% not specified) |
| Solvent system | Deionized water | Non-aqueous or low-water | aqueous | Aqueous-organic mixture (exact composition not specified) | Deionized water | Deionized water |
| Extrusion quality | Stable flow, no clogging | Claims smooth flow; no quantitative | Not applicable (injection molding-like casting) | Good flow; fiber alignment observed; some porosity | Required hot pressing for densification; extrusion quality not detailed | Designed for porosity; extrusion quality not specified |
| Microstructure | Uniform, fiber-free TaC | Focused on bioceramics; microstructure not shown | Short carbon fiber reinforcement; heterogeneous microstructure | Chopped fiber reinforcement; micro-porosity present | Aligned continuous fibers; anisotropic properties | Hierarchical porous structure |
| Sintering effect | Pressureless sintering 87% densification, ~25% shrinkage, no defects | Densification not quantified; UHTC not claimed | Pressureless, shrinkage not specified | Pressureless; ~89% TD, microstructural porosity retained | Hot pressed | Pressureless at 1700°C; ~28% linear shrinkage, ~85–90% densification |
| Novelty | High-loading TaC DIW ink enabling geometry retention without fiber support | | | | | |

FIG. 4

ULTRA HIGH TEMPERATURE CERAMICS (UHTCS) INK WITH IMPROVED PROCESSABILITY AND DIMENSIONAL CONTROL

GOVERNMENT SUPPORT

This invention was made with government support under N00014-23-1-2649 awarded by the Office of Naval Research. The government has certain rights in the invention.

BACKGROUND

Ultra-high temperature ceramics (UHTCs) are used in aerospace applications such as thermal protection systems and rocket nozzles due to the extreme thermal and mechanical properties. However, the high melting points, hardness, and brittleness make conventional and non-traditional machining difficult, often introducing defects. Additive manufacturing, particularly three-dimensional (3D) printing via direct ink writing (DIW), enables near-net-shape fabrication of complex UHTC parts with reduced post-processing requirements.

DIW performance is limited by achievable solid loading. Increasing the ceramic content raises ink viscosity and promotes particle agglomeration, which negatively affects print quality and material uniformity.

BRIEF SUMMARY

There is a need in the art for a novel ink composition that allows for ultra-high solid loading of ultra-high temperature ceramics (UHTCs) while maintaining favorable rheological properties for extrusion-based additive manufacturing, with enhanced shrinkage control during sintering. In view of the challenges discussed in the Background, embodiments of the subject invention provide novel and advantageous compositions and methods for generating ultra-high loaded, ultra-high temperature ceramics (UHTCs) ink for extrusion three-dimensional (3D) printing with enhanced shrinkage control.

In an embodiment, a composition for generating ultra-high loaded, UHTC ink for extrusion 3D printing with enhanced shrinkage control can comprise: a ceramic powder present in an amount of from 80 weight percent (wt %) (or approximately 80 wt %) to 95 wt % (or about 95 wt %) of the composition (and/or of the ink), the ceramic powder comprising a single-phase UHTC material; a plasticizer present in an amount of from 1 wt % (or approximately 1 wt %) to 3 wt % (or approximately 3 wt %) of the composition (and/or of the ink); a dispersant present in an amount of approximately 0.5 wt % (or approximately 0.5 wt %) to 1.5 wt % (or approximately 1.5 wt %) of the composition (and/or of the ink); and a solvent present in an amount sufficient to form the ink that is stable and suitable for 3D printing. The ceramic powder can be tantalum carbide (TaC), and/or can be present in an amount of 87 wt % (or approximately 87 wt %) of the composition (and/or of the ink). The plasticizer can be glycerol, can be present in an amount of 2 wt % (or approximately 2 wt %) of the composition (and/or of the ink), can have a purity of at least 99%, and/or can be configured to reduce viscosity and enhance extrudability of the ink. The dispersant can be polyacrylic acid (PAA), can be present in an amount of 1 wt % (or approximately 1 wt %) of the composition (and/or of the ink), can have a molecular weight of 2000 grams per mole (g/mol), about 2000 g/mol, at least 2000 g/mol, or at most 2000 g/mol, and/or can be configured to disperse particles comprising the ceramic powder (e.g., TaC) via electrostatic repulsion and/or steric stabilization, thereby preventing or inhibiting agglomeration of the ceramic powder. The solvent can be water, and/or can be present in an amount of 10 wt % (or approximately 10 wt %) of the composition (and/or of the ink). The ink can exhibit shear-thinning behavior and sufficient mechanical strength to enable shape retention post-extrusion during printing. The ink can be printable via direct ink writing, exhibiting consistent flow during extrusion and being free of nozzle clogging. The ink can be configured to produce (and/or capable of producing) stable extrusion under shear conditions and to prevent or inhibit backpressure-induced print defects. The ink can be configured to print (and/or capable of printing) complex geometries including converging-diverging nozzle shapes. A printed green body derived from the ink can be sintered without the application of external pressure to fabricate parts of the ceramic powder (e.g., TaC), eliminating the need for any structural support (e.g., any fiber-based structural support).

In another embodiment, a method for generating ultra-high loaded, UHTCs ink for extrusion 3D printing with enhanced shrinkage control can comprise: providing a ceramic powder present in an amount of from 80 weight percent (wt %) (or approximately 80 wt %) to 95 wt % (or about 95 wt %) of the ink, the ceramic powder comprising a single-phase UHTC material; adding a plasticizer present in an amount of from 1 wt % (or approximately 1 wt %) to 3 wt % (or approximately 3 wt %) of the ink; adding a dispersant present in an amount of approximately 0.5 wt % (or approximately 0.5 wt %) to 1.5 wt % (or approximately 1.5 wt %) of the ink; and adding a solvent present in an amount sufficient to form the ink that is stable and suitable for 3D printing. The ceramic powder can be TaC, and/or can be present in an amount of 87 wt % (or approximately 87 wt %) of the ink. The plasticizer can be glycerol, can be present in an amount of 2 wt % (or approximately 2 wt %) of the ink, can have a purity of at least 99%, and/or can be configured to reduce viscosity and enhance extrudability of the ink. The dispersant can be polyacrylic acid (PAA), can be present in an amount of 1 wt % (or approximately 1 wt %) of the ink, can have a molecular weight of 2000 g/mol, about 2000 g/mol, at least 2000 g/mol, or at most 2000 g/mol, and/or can be configured to disperse particles comprising the ceramic powder (e.g., TaC) via electrostatic repulsion and/or steric stabilization, thereby preventing or inhibiting agglomeration of the ceramic powder. The solvent can be water, and/or can be present in an amount of 10 wt % (or approximately 10 wt %) of the ink. The ink can exhibit shear-thinning behavior and sufficient mechanical strength to enable shape retention post-extrusion during printing. The ink can be printable via direct ink writing, exhibiting consistent flow during extrusion and being free of nozzle clogging. The ink can be configured to produce (and/or capable of producing) stable extrusion under shear conditions and to prevent or inhibit backpressure-induced print defects. The ink can be configured to print (and/or capable of printing) complex geometries including converging-diverging nozzle shapes. The method can further comprise deriving a printed green body from the ink by sintering without the application of external pressure to fabricate parts of the ceramic powder (e.g., TaC), eliminating the need for any structural support (e.g., any fiber-based structural support).

BRIEF DESCRIPTION OF DRAWINGS

FIG. 4 shows a table of a comparative analysis highlighting key differentiators between embodiments of the subject invention and the prior art.

DETAILED DESCRIPTION

Figure 1:
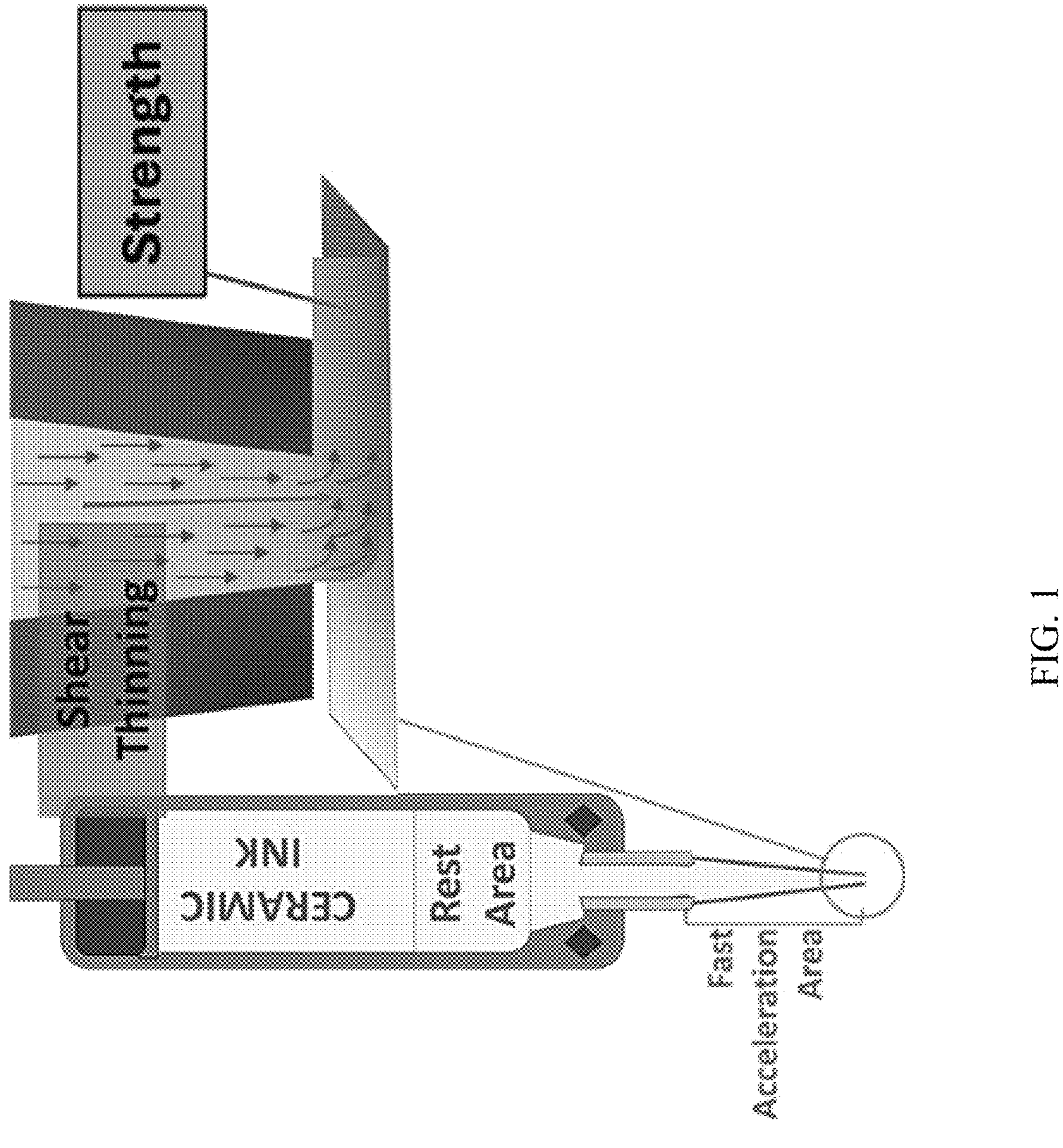
FIG. 1 shows a schematic view of ink flow dynamics during direct ink writing (DIW) of ceramic inks showing fast acceleration and shear-thinning in the nozzle region during extrusion and in static or resting state in the syringe body and post extrusion on the print bed.

Embodiments of the subject invention provide novel and advantageous compositions and methods for generating ultra-high loaded, ultra-high temperature ceramics (UHTCs) ink for extrusion three-dimensional (3D) printing with enhanced shrinkage control.

UHTCs, such as tantalum carbide (TaC), are ideally suited for extreme aerospace applications due to the exceptional properties, including a melting point above 3000° C., high hardness, superior thermal conductivity, elevated elastic modulus, and outstanding wear resistance. The applications include thermal protection systems, rocket nozzles and leading edge of hypersonic and re-entry vehicles. However, the high melting temperature of TaC, approximately 3880° C., combined with its high hardness and brittle nature, makes traditional manufacturing techniques challenging. Non-traditional machining methods for ceramic manufacturing, such as electrical discharge machining (EDM) and laser-based techniques introduce machining and microstructural defects making UHTC based parts mechanically and thermally non-compliant. In contrast, additive manufacturing offers a novel approach to manufacture complex TaC geometries to near-net shape, thereby minimizing post-machining and associated defects. Extrusion-based additive manufacturing processes, such as direct ink writing (DIW), are particularly well-suited for producing high-density UHTCs. However, DIW technique is constrained by the solid loading capacity, which is defined as the weight percentage of ceramic material that can be effectively incorporated into the ink formulation. A higher solid loading, especially of high-density UHTCs such as TaC, poses challenges including increased viscosity, which complicates extrusion and may compromise the precision of the printing process. With increased solid loading, chances of particle agglomeration increase resulting in heterogeneous mixture and anisotropic material properties.

This problem can be resolved by optimizing the ink composition by adding appropriate amount of plasticizer (a rheology modifier that reduces viscosity) and dispersant (a rheological aid that minimizes interparticle attractions) to the ceramic suspended in the base matrix containing water. No composition is currently known that permits incorporation of greater than 80 wt % of a high-density (>10 g/cm$^3$) UHTC, comprising exclusively UHTC without any additional fibers, suitable for DIW process. This methodology successfully branches out and encompasses multi-component UHTCs (MC-UHTC), which allow for even higher solid loading (e.g., at least 90 wt %, such as 91 wt % or about 91 wt %) while remaining in the high-density regime (greater than 10 grams per cubic centimeter (g/cm$^3$). The higher solid loading for MCUHTCs allows for even higher final densification (e.g., at least 95%, such as 98% or about 98%) post sintering. The methodology can further be extended to develop novel ink compositions for other UHTC carbides, borides and nitrides, high-entropy (HE) combinations of the UHTCs often called as HE-UHTCs and the composites.

Embodiments of the subject invention offer a novel composition for DIW inks containing TaC having a density of 14.6 g/cm$^3$, achieved by utilizing a formalized formulation approach that optimizes particle dispersion, rheological properties, and printability. The ink composition comprises the following components to ensure stable suspension of TaC particles, enabling precise deposition and subsequent sintering to produce dense ceramic components with enhanced mechanical and thermal properties.

Plasticizer addition: The incorporation of glycerol at 2 wt %, having a purity of greater than 99%, functions as a compatible plasticizer, improving the flow characteristics and printability of colloidal TaC inks by enhancing shear-thinning behavior and reducing viscosity, which facilitates smooth and continuous extrusion during DIW. Glycerol mitigates nozzle clogging by softening the ink under shear conditions, preventing pressure spikes that can cause defects. Glycerol also improves interlayer adhesion (as a binder), reduces drying-induced cracking or delamination, and increases strength to ensure shape retention post-extrusion.

Dispersant addition: Polyacrylic acid (PAA), incorporated at 1 wt % with a molecular weight of 2000 g/mol is employed as a dispersant to promote electrosteric stabilization of TaC particles within the aqueous ink formulation. PAA adsorbs onto particle surfaces, minimizing interparticle interactions and effectively inhibiting agglomeration, which remains a fundamental challenge in ceramic colloidal systems. At the concentration, PAA enables effective dispersion of TaC particles without inducing polymer entanglement, which could otherwise increase viscosity or impair shear-thinning. In the absence of PAA, the maximum attainable ceramic loading is substantially reduced, resulting in greater volumetric shrinkage during sintering and an elevated risk of defects such as cracking or delamination.

Figure 3:
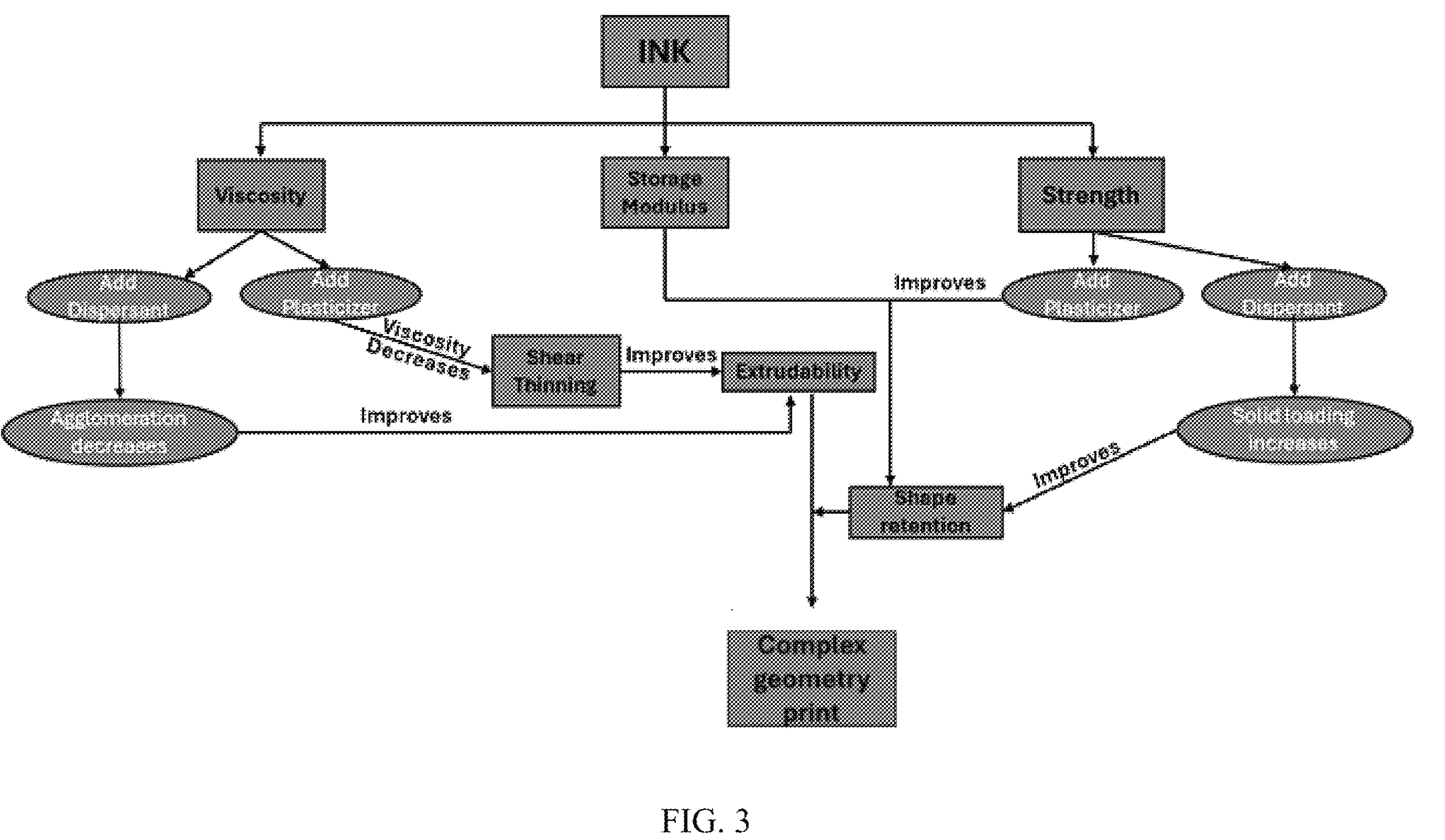
FIG. 3 shows process-structure-property relationships in the formulation of ceramic ink for DIW, according to an embodiment of the subject invention. The interactions between plasticizers and dispersants critically influence key rheological properties, including viscosity, shear-thinning behavior, yield strength, and particle agglomeration. Plasticizers reduce viscosity and enhance shear-thinning and mechanical strength, thereby improving extrudability, shape retention, and mitigating nozzle clogging. Dispersants inhibit particle agglomeration and enable higher solid loading, which contributes to improved print fidelity and densification. These effects govern the ink's printability and the structural integrity of the resultant printed ceramic part.

FIG. 3 shows process-structure-property relationships in the formulation of ceramic ink for DIW. The interactions between plasticizers and dispersants critically influence key rheological properties, including viscosity, shear-thinning behavior, yield strength, and particle agglomeration. Plasticizers reduce viscosity and enhance shear-thinning and mechanical strength, thereby improving extrudability, shape retention, and mitigating nozzle clogging. Dispersants inhibit particle agglomeration and enable higher solid loading, which contributes to improved print fidelity and densification. These effects govern the ink's printability and the structural integrity of the resultant printed ceramic part.

In DIW, the ink is extruded from a syringe through a fine nozzle and deposited layer-by-layer onto a substrate according to a predetermined toolpath to fabricate the desired 3D structure. FIG. 1 shows a schematic view of ink flow dynamics during DIW process of ceramic inks, demonstrating the rapid acceleration and shear-thinning behavior occurring within the nozzle region during extrusion, as well as the static or resting state of the ink within the syringe body and post extrusion on the print bed. During extrusion, the ink undergoes rapid rheological transitions. As the initially static ink is pushed through the confined nozzle geometry, the ink experiences a significant increase in shear rate, rendering shear-thinning behavior a critical requirement for successful deposition. Upon exiting the nozzle, the ink flow decelerates and comes to rest on the substrate, where the ink must exhibit sufficient mechanical strength to support the weight of the subsequently deposited layers and maintain dimensional fidelity. Such a requirement necessitates a careful balance between flowability during extrusion and structural integrity post-deposition, underscoring the importance of precise rheological control, particularly as the ceramic solid loading increases. Consequently, optimizing the ink composition is essential to address the complex interplay between flow dynamics and shape retention inherent in DIW process. The optimized ink enables to print complex geometries including converging-diverging nozzle shapes. The capability of DIW to produce near-net-shape ceramic components positions DIW as a promising fabrication technique for advanced materials, such as TaC, which is highly valued for applications in rocket propulsion systems, hypersonic vehicle nose cones, control surfaces, and thermal protection systems for atmospheric re-entry.

Figure 2:
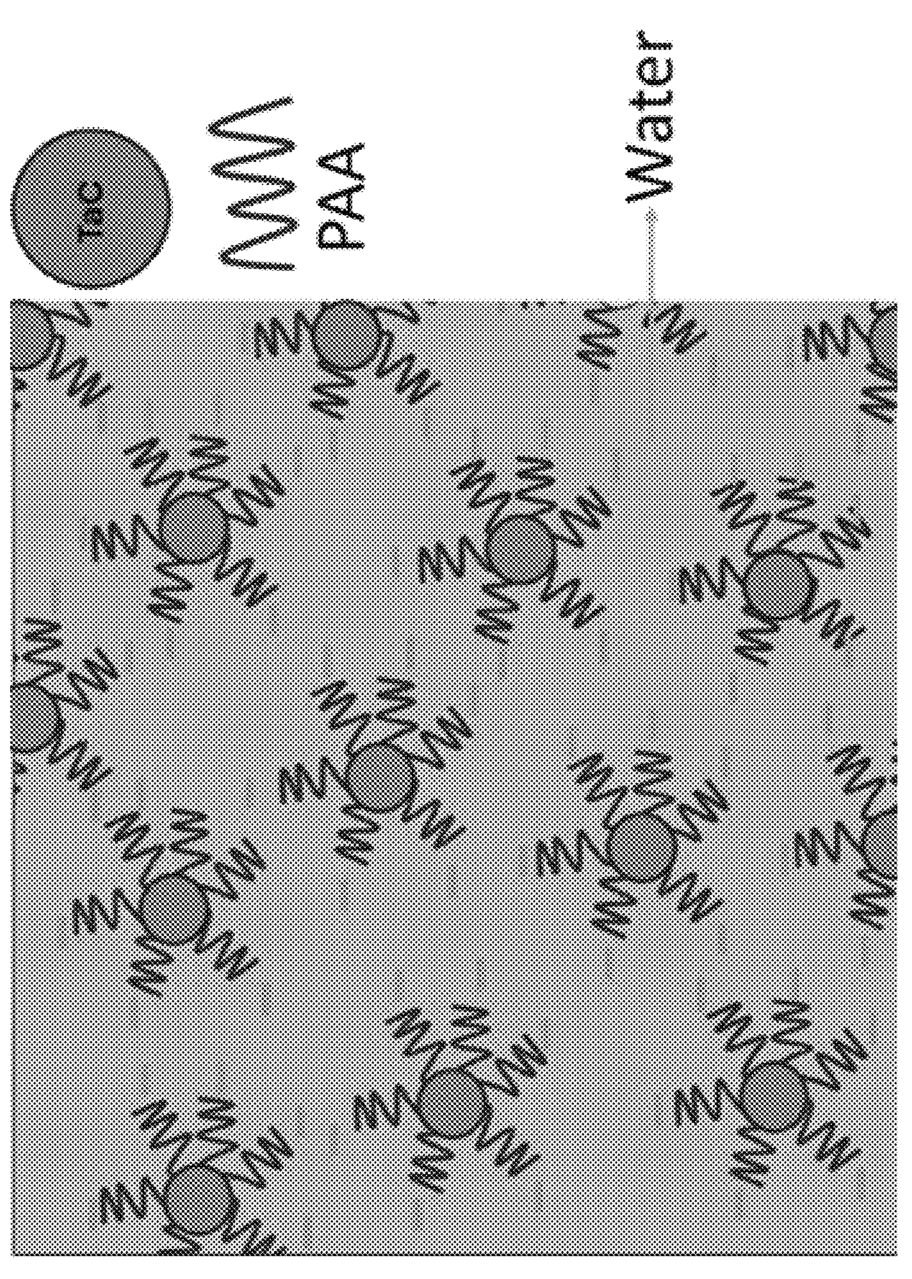
FIG. 2 shows a schematic view of a colloidal ink comprising tantalum carbide (TaC), according to an embodiment of the subject invention. TaC particles are depicted as spheres and are uniformly dispersed in an aqueous medium comprising water and glycerol and stabilized by adsorbed polyacrylic acid (PAA) chains, which is represented in coil form. The dashes represent negative charges on the PAA backbone, which induce electrostatic repulsion and inhibit particle agglomeration.

Embodiments of the subject invention provide a novel ink formulation for DIW of TaC, a high-density UHTC. FIG. 2 shows a schematic view of a colloidal ink comprising TaC. The ink, comprising 87 wt % of TaC, a high-density UHTC having a density of 14.6 g/cm3 dispersed in 10 wt % of water, is stabilized with 2 wt % of glycerol as a plasticizer and 1 wt % of PAA as a dispersant. TaC particles are uniformly dispersed in an aqueous medium comprising water and glycerol and stabilized by adsorbed PAA chains. The negative charges on the PAA backbone induce electrostatic repulsion and inhibit particle agglomeration. The optimized composition guarantees superior extrudability and shape retention during printing process, including at elevated solid loadings. The ink formulation allows for precise flow control and facilitates the fabrication of complex UHTC components with minimal manufacturing defects. Moreover, the low polymeric content, including plasticizer and dispersant, present at approximately 3 wt % allows for efficient burnout during sintering, thereby enhancing shrinkage control and resulting in high-density TaC components characterized by minimal volumetric shrinkage (<25%) and the absence of visible delamination or cracking.

Embodiments of the subject invention represent a substantial advancement in DIW of UHTCs, specifically through the development of a high-performance ink formulation for TaC, one of the densest and most refractory ceramics known, possessing a melting point exceeding 3800° C. and a density of approximately 14.6 g/cm$^3$. Unlike previous DIW efforts primarily focused on lower-density ceramics such as $ZrB_2$—SiC (1.5-10 g/cm$^3$), which typically support ceramic loadings of in the range of only 65-80 wt %, as shown in FIG. 4, embodiments enable an exceptionally high solid loading of 87 wt % of TaC, while maintaining excellent rheological stability and printability.

Achieving such high loading for a dense ceramic presents significant challenges due to the increased risk of sedimentation, agglomeration, and phase separation. However, the ink formulation developed herein effectively addresses these issues through the synergistic incorporation of 2 wt % of glycerol as a plasticizer and 1 wt % of PAA as a dispersant. The minimal polymeric additives not only enable electrosteric stabilization and viscosity reduction but also promote shear-thinning behavior and provide sufficient green strength to retain complex geometries after extrusion. Critically, the low organic content minimizes mass loss and shrinkage during sintering, key to preserving dimensional accuracy and preventing defects such as cracking and delamination.

In contrast to conventional UHTC inks, which frequently necessitate fiber reinforcement, low ceramic loading, or post-processing such as hot pressing to preserve structural integrity, single-phase TaC ink enables the extrusion and sintering of geometrically complex components, such as rocket nozzles without defects, layer collapse, or nozzle clogging. This water-based ink is environmentally benign and fully compatible with standard DIW systems, thereby enabling scalable and sustainable manufacturing.

Following sintering, the printed components exhibit remarkable structural integrity, with no observable warping, delamination, or cracking. The printed components demonstrate minimal mass loss of approximately 3 wt % and controlled volumetric shrinkage of less than 25%, achieved without the application of external pressure. The ink produces stable extrusion under shear conditions and inhibits print defects caused by backpressure. Performance metrics of the current method surpass the values typically observed in UHTC DIW processes, where volumetric shrinkage frequently exceeds 44%. This advancement in the fabrication of high solid-loading, high-density TaC components, characterized by significant dimensional accuracy and defect-free quality, establishes a new standard in UHTC additive manufacturing and substantially expands the applicability of DIW for applications in extreme environments.

Embodiments of the subject invention provide a focused technical solution to the focused technical problem of how to generate ultra-high loaded, UHTC ink for extrusion 3D printing with enhanced shrinkage control. The solution is provided by a novel ink formulation comprising 87 wt % of TaC, a high-density UHTC, dispersed in 10 wt % of water, and stabilized with 2 wt % of glycerol as a plasticizer and 1 wt % of PAA as a dispersant. Embodiments of the subject invention have the focused, technologically-specific practical application in the field of additive manufacturing, particularly 3D printing via DIW, which enables the near-net-shape fabrication of complex UHTC components while significantly reducing post-processing requirements, without the need for applied pressure or supporting fibers, thereby enabling minimized shrinkage during DIW.

When ranges are used herein, combinations and subcombinations of ranges (including any value or subrange contained therein) are intended to be explicitly included. When the term "about" or "approximately" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

A greater understanding of the embodiments of the subject invention and of their many advantages may be had from the following examples, given by way of illustration.

The following examples are illustrative of some of the methods, applications, embodiments, and variants of the present invention. They are, of course, not to be considered as limiting the invention. Numerous changes and modifications can be made with respect to embodiments of the invention.

Materials and Methods

The density of both the ceramic powder and the sintered samples was measured using a helium gas pycnometer as the density measurement process. Separate calibration procedures were performed prior to each set of measurements to ensure accuracy. For the powder measurements, a meso-sized chamber was used to allow free gas flow through the sample, while a medium-sized solid chamber was employed for the sintered prints. Each sample was measured over seven consecutive runs to ensure consistency and reliability of the data, and the reported density values represent the average of these runs.

Example 1

The densification results indicate that the printed structures formulated with the novel ink composition achieve high levels of densification upon sintering while effectively maintaining the geometric integrity.

Average sample density via pycnometer: 14.15±0.53 g/cm$^3$

Average powder density via pycnometer: 14.61±0.07 g/cm$^3$ $$\text{Densification (\%)} = \frac{\text{Sintered Density}}{\text{Theoretical Density}} \times 100$$

Theoretical density of TaC: 14.6 g/cm$^3$

Density of powder used: 14.61 g/cm$^3$

Sintered density: 14.15 g/cm$^3$

Densification:

$$\frac{14.15}{14.61} \times 100 = 96.85\%$$

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A composition for generating ultra-high loaded, ultra-high temperature ceramic (UHTC) ink for extrusion three-dimensional (3D) printing with enhanced shrinkage control, the composition comprising:

a ceramic powder present in an amount of from 80 weight percent (wt %) to 95 wt % of the composition, the ceramic powder comprising a single-phase UHTC material;

a plasticizer present in an amount of from 1 wt % to 3 wt % of the composition;

a dispersant present in an amount of approximately 0.5 wt % to 1.5 wt % of the composition; and a solvent present in an amount sufficient to form the ink such that it is stable and suitable for 3D printing, wherein the solvent is water, present in an amount of approximately 10 wt % of the composition.

2. The composition according to claim 1, wherein the ceramic powder is tantalum carbide (TaC) present in an amount of approximately 87 wt % of the composition.

3. The composition according to claim 1, wherein the plasticizer is glycerol, present in an amount of approximately 2 wt % of the composition, having a purity of at least 99%, and being configured to reduce viscosity and enhance extrudability of the ink.

4. The composition according to claim 1, wherein the dispersant being is polyacrylic acid (PAA), present in an amount of approximately 1 wt % of the composition, having a molecular weight of at least 2000 grams per mole (g/mol), and being configured to disperse particles comprising the ceramic powder via electrostatic repulsion and steric stabilization, thereby inhibiting agglomeration of the ceramic powder.

5. The composition according to claim 1, wherein the ink exhibits shear-thinning behavior and sufficient mechanical strength to enable shape retention post-extrusion during printing.

6. The composition according to claim 1, wherein the ink is configured to be printable via direct ink writing, exhibiting consistent flow during extrusion and being free of nozzle clogging.

7. The composition according to claim 1, wherein the ink is configured to produce stable extrusion under shear conditions and to inhibit backpressure-induced print defects.

8. The composition according to claim 1, wherein the ink is configured to print complex geometries including converging-diverging nozzle shapes.

9. The composition according to claim 1, wherein a printed green body derived from the composition is sintered without application of external pressure to fabricate parts of the ceramic powder, eliminating any need for fiber-based structural support.

10. A method for generating ultra-high loaded, ultra-high temperature ceramic (UHTC) ink for extrusion three-dimensional (3D) printing with enhanced shrinkage control, the method comprising:

providing a ceramic powder in an amount of from 80 weight percent (wt %) to 95 wt % of the ink, the ceramic powder comprising a single-phase UHTC material;

adding a plasticizer in an amount of from 1 wt % to 3 wt % of the ink;

adding a dispersant in an amount of from 0.5 wt % to 1.5 wt % of the ink; and adding a solvent in an amount sufficient to form the ink such that it is stable and suitable for 3D printing, wherein the solvent is water, present in an amount of approximately 10 wt % of the ink.

11. The method according to claim 10, wherein the ceramic powder is tantalum carbide (TaC) present in an amount of approximately 87 wt % of the ink.

12. The method according to claim 10, wherein the plasticizer is glycerol, present in an amount of approximately 2 wt % of the ink, having a purity of at least 99%, and being configured to reduce viscosity and enhance extrudability of the ink.

13. The method according to claim 10, wherein the dispersant is polyacrylic acid (PAA), present in an amount of approximately 1 wt % of the ink, having a molecular weight of at least 2000 grams per mole (g/mol), and being configured to disperse particles comprising the ceramic powder via electrostatic repulsion and steric stabilization, thereby inhibiting agglomeration of the ceramic powder.

14. The method according to claim 10, wherein the ink exhibits shear-thinning behavior and sufficient mechanical strength to enable shape retention post-extrusion during printing.

15. The method according to claim 10, wherein the ink is configured to be printable via direct ink writing, exhibiting consistent flow during extrusion and being free of nozzle clogging.

16. The method according to claim 10, wherein the ink is configured to produce stable extrusion under shear conditions and to inhibit backpressure-induced print defects, and wherein the ink is configured to print complex geometries including converging-diverging nozzle shapes.

17. The method according to claim 10, further comprising deriving a printed green body from the ink by sintering without application of external pressure to fabricate parts of the ceramic powder, eliminating the need for any fiber-based structural support.

18. A composition for generating ultra-high loaded, ultra-high temperature ceramics (UHTCs) ink for extrusion three-dimensional (3D) printing with enhanced shrinkage control, the composition comprising:

a ceramic powder comprising a single-phase UHTC material;

a plasticizer;

a dispersant; and a solvent present in an amount sufficient to form the ink such that it is stable and suitable for 3D printing, wherein the ceramic powder is tantalum carbide (TaC) present in an amount of approximately 87 weight percent (wt %) of the composition, wherein the plasticizer is glycerol, present in an amount of approximately 2 wt % of the composition, having a purity of at least 99%, and being configured to reduce viscosity and enhance extrudability of the ink, wherein the dispersant is polyacrylic acid (PAA), present in an amount of approximately 1 wt % of the composition, having a molecular weight of at least 2000 grams per mole (g/mol), and being configured to disperse particles comprising the TaC via electrostatic repulsion and steric stabilization, thereby inhibiting agglomeration of the TaC, wherein the solvent is water, present in an amount of approximately 10 wt % of the composition, wherein the ink exhibits shear-thinning behavior and sufficient mechanical strength to enable shape retention post-extrusion during printing, wherein the ink is configured to be printable via direct ink writing, exhibiting consistent flow during extrusion and being free of nozzle clogging, wherein the ink is configured to produce stable extrusion under shear conditions and to inhibit backpressure-induced print defects, and wherein the ink is configured to print complex geometries including converging-diverging nozzle shapes.

* * * * *